United States Patent
Yoshida

(10) Patent No.: US 9,541,152 B2
(45) Date of Patent: Jan. 10, 2017

(54) SUSPENSION APPARATUS

(71) Applicant: SHOWA CORPORATION, Gyoda-shi (JP)

(72) Inventor: Kojiro Yoshida, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/258,328

(22) Filed: Apr. 22, 2014

(65) Prior Publication Data

US 2015/0096852 A1 Apr. 9, 2015

(30) Foreign Application Priority Data

Oct. 4, 2013 (JP) .................................. 2013-209723

(51) Int. Cl.
| | | |
|---|---|---|
| F16F 9/34 | (2006.01) | |
| F16F 9/18 | (2006.01) | |
| B62K 25/08 | (2006.01) | |
| F16F 9/43 | (2006.01) | |
| F16F 9/22 | (2006.01) | |

(52) U.S. Cl.
CPC ............... *F16F 9/341* (2013.01); *B62K 25/08* (2013.01); *F16F 9/185* (2013.01); *F16F 9/22* (2013.01); *F16F 9/43* (2013.01)

(58) Field of Classification Search
CPC ............ F16F 9/466; F16F 9/341; F16F 9/185; F16F 9/43; F16F 9/22; B62K 25/08
See application file for complete search history.

(56) References Cited

U.S. PATENT DOCUMENTS

| 2003/0192755 A1* | 10/2003 | Barbison et al. ........ 188/322.13 |
| 2003/0213664 A1* | 11/2003 | Beck .............................. 188/289 |
| 2005/0145456 A1* | 7/2005 | Tomonaga ............ F16F 9/3271 |
| | | 188/297 |
| 2009/0084644 A1* | 4/2009 | Murakami ................. 188/266.6 |
| 2011/0147148 A1 | 6/2011 | Ripa |
| 2013/0081912 A1 | 4/2013 | Murakami |

(Continued)

FOREIGN PATENT DOCUMENTS

| EP | 2042770 A | 4/2009 |
| EP | 2042770 A2 * | 4/2009 |

(Continued)

OTHER PUBLICATIONS

European Search Report mailed Mar. 31, 2015 for the corresponding European Application No. 14165782.5.

*Primary Examiner* — Vishal Sahni
(74) *Attorney, Agent, or Firm* — Leason Ellis LLP

(57) ABSTRACT

A suspension apparatus includes: a partition wall member that divides a space inside an inner tube into an upper space and a lower space; a cap that covers an upper opening portion of an outer tube; and a support member of which one end portion is retained by the cap, and of which the other end portion supports the other end portion of a piston rod, in which a through-hole is formed in a portion of the inner tube, an inner space of the piton rod is a space inside the piston rod and communicates with the lower space, the support member is a cylindrical member and forms an upper portion space, and the upper portion space communicates with the inner space of the piston rod, and at least one of the cap and the support member is provided with a communication path.

10 Claims, 10 Drawing Sheets

(56) References Cited

U.S. PATENT DOCUMENTS

2013/0313057 A1\* 11/2013 Tsukahara et al. ........... 188/313

FOREIGN PATENT DOCUMENTS

| EP | 2193986 A | | 6/2010 |
|---|---|---|---|
| EP | 2193986 A1 | * | 6/2010 |
| JP | 2009-085263 A | | 4/2009 |
| JP | 2009-103284 A | | 5/2009 |
| JP | 2010-038172 A | | 2/2010 |
| JP | 2011-094710 A | | 5/2011 |
| JP | 2011-214584 A | | 10/2011 |
| JP | 2012-026564 A | | 2/2012 |
| JP | 2012-031918 A | * | 2/2012 |
| JP | 2012-031918 A | | 2/2012 |

\* cited by examiner

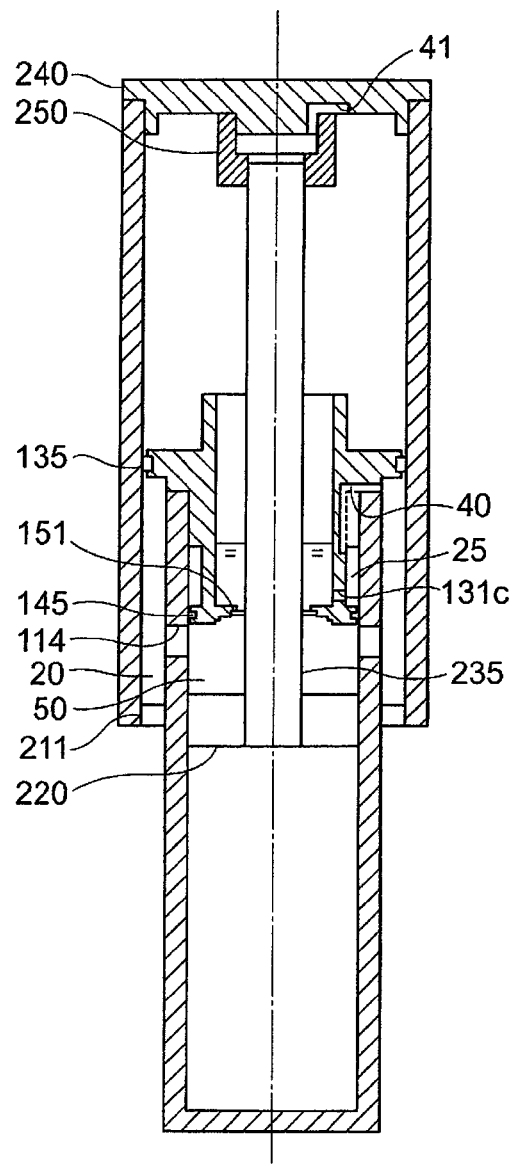
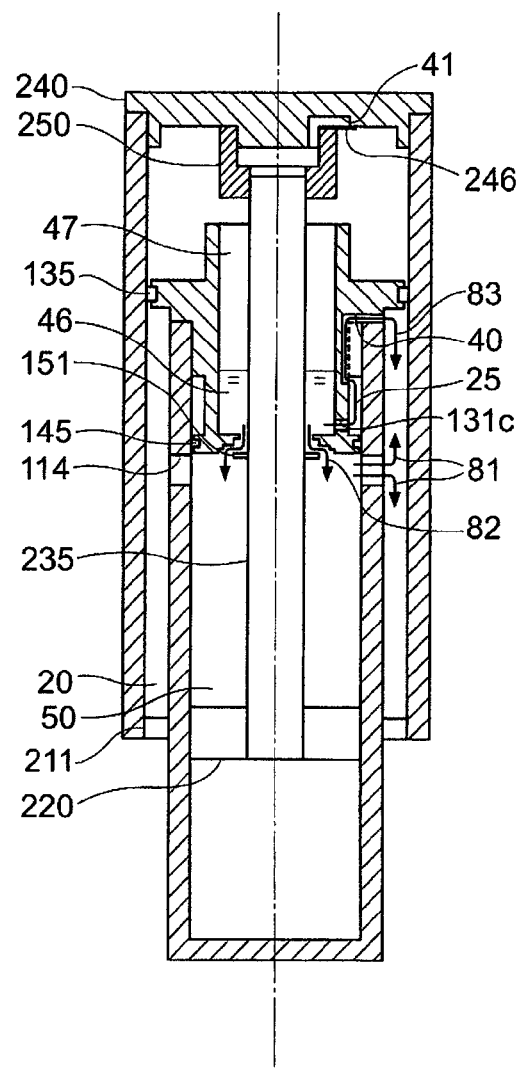
FIG. 8A
FIG. 8B

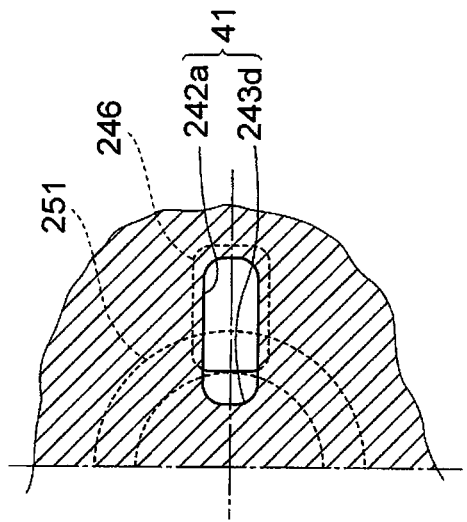
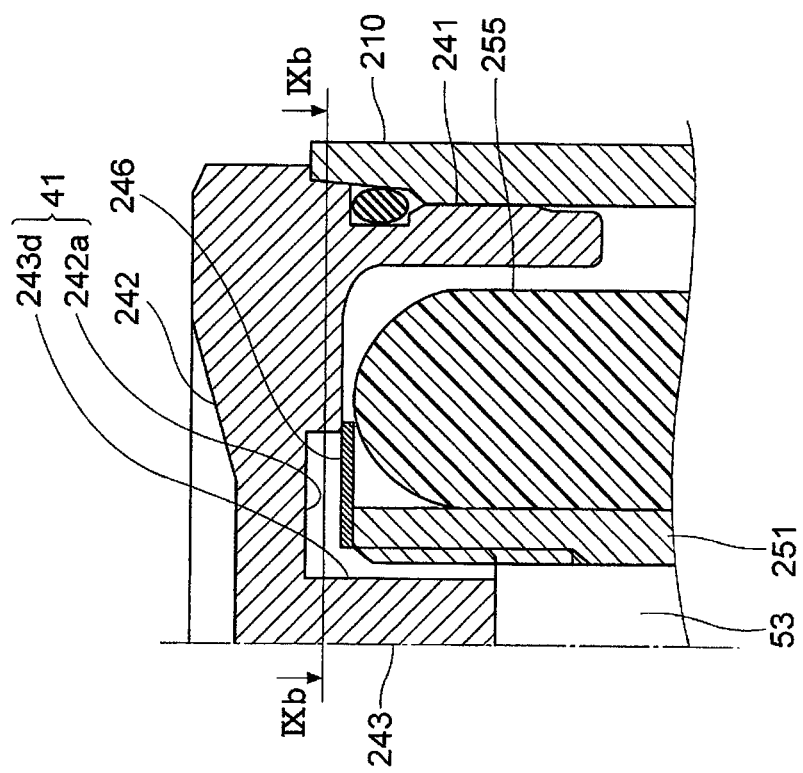
FIG. 9B
FIG. 9A

SUSPENSION APPARATUS

CROSS-REFERENCE TO RELATED APPLICATIONS

This application is based on and claims priority under 35 U.S.C. 119 from Japanese Patent Application No. 2013-209723 filed on Oct. 4, 2013, the entire content of which is incorporated herein by reference.

BACKGROUND

1. Technical Field

The present invention relates to a suspension apparatus that is arranged between a vehicle body and a wheel in a two-wheeled vehicle or the like.

2. Related Art

In the related art, in a front fork in a two-wheeled vehicle known as an example of a suspension apparatus, bushes are fixed to an upper portion and a lower portion of an inner circumference of an outer tube, an inner tube is slidably fitted into the outer tube via the upper and the lower bushes, an annular oil chamber that is defined by the upper and the lower bushes is formed in a space between the inner circumference of the outer tube and an outer circumference of the inner tube, and thus a volume compensation chamber is formed to compensate for a volume affected by entry and retreat of a piston rod during a stroke of a piston.

In this type of the suspension apparatus, a hydraulic shock absorber according to JP-A-2009-85263 has a partition wall member which is mounted to the inside on an opening end side of the inner tube so that the partition wall chamber guides the piston rod mounted to the outer tube. The partition wall member is configured to have a cylindrical portion that is formed into a cylindrical shape along an inner circumference of the inner tube, and a bottom portion that is provided to block the bottom of the cylindrical portion. In a state where the cylindrical portion is screwed into the inner tube and the bottom portion is positioned inside the inner tube, using the bottom portion as a reference portion, the partition wall member divides a working oil chamber that is formed below the bottom portion from an oil reservoir chamber which is formed above the bottom portion. A piston mounted to the piston rod that is fixed to the outer tube slides inside the working oil chamber. The oil reservoir chamber supplies working oil to the working oil chamber and vice versa. The working oil chamber communicates with the annular oil chamber through an oil hole provided in the inner tube, and the working oil freely circulates therebetween. When the hydraulic shock absorber is compressed, the working oil flows from the working oil chamber into the annular oil chamber by a volume taken up by the piston rod entering the working oil chamber by a stroke. When the hydraulic shock absorber is extended, the working oil flows from the annular oil chamber into the working oil chamber by a volume freed up by the piston rod retreating from the working oil chamber by a stroke. Accordingly, a volume affected by entry and retreat of the piston rod is compensated for, and a predetermined damping force is obtained. In addition, in the hydraulic shock absorber according to JP-A-2009-85263, a plurality of adjusting portions are provided in a cap that seals an upper end opening portion of the outer tube, and the plurality of adjusting portions are placed side by side in a plan view of the cap. Each of the plurality of adjusting portions is configured to have an adjusting bolt and the adjusting portions have a plurality of adjusting nuts that match with the respective adjusting bolts. Each of the adjusting nuts has a screwed hole into which one adjusting bolt matching with one adjusting nut is screwed, and another hole that is a guide hole into which another adjusting bolt is inserted. When one of the adjusting bolts is rotated, one of the adjusting nuts into which the adjusting bolt is screwed is configured in such a manner that the adjusting nut is not rotated and is guided to move axially due to engagement of the guide hole of the adjusting nut and the other adjusting bolt.

SUMMARY OF INVENTION

In the suspension apparatus according to JP-A-2009-85263, there is a problem in that air bubbles in working oil gradually gather around the plurality of adjusting bolts that are provided in each of the plurality of adjusting portions and air bubble entrapment is formed. During extension operation in a case where the air bubble entrapment is formed in these portions, since a predetermined damping force is obtained after the air bubble entrapment is compressed by the working oil, damping operation is delayed. In addition, since the supply of the working oil into an oil chamber formed below the piston inside the working oil chamber is delayed, pressure in the oil chamber rapidly decreases, a gaseous component in the working oil is separated, and an air bubble grows. Thereafter, during compression operation, an impulse sound occurs at the time a growing air bubble is instantaneously compressed to dissipate.

An object of the invention is to provide a suspension apparatus that can suppress occurrence of an impulse sound caused by occurrence of air bubble entrapment in a space in which air is present and in which pressure increases during extension operation.

[1] According to an aspect of the invention, it provides that an suspension apparatus includes a cylindrical outer tube; an inner tube which is coaxially arranged inside the outer tube to move in an axial direction relative to the outer tube; a piston inserted into the inner tube; a piston rod of which one end portion retains the piston and which moves together with the outer tube with respect to the inner tube; a partition wall member that is mounted to an upper end portion of the inner tube to define an upper end portion of an annular oil chamber which is formed between an inner circumferential surface of the outer tube and an outer circumferential surface of the inner tube, that has a bowl portion formed into a bowl shape located inside the inner tube, and that divides a space inside the inner tube into an upper space which is a space above the bowl portion and a lower space which is a space below the bowl portion; a cap that covers an upper opening portion of the outer tube; a support member of which one end portion is retained by the cap, and of which the other end portion supports the other end portion of the piston rod. A through-hole is formed in a portion of the inner tube which is below the partition wall member to communicate the annular oil chamber with the lower space. An inner space of the piston rod is a space inside the piston rod and communicates with the lower space. The support member is a cylindrical member and forms an upper portion space between the cap and the support member, and the upper portion space communicates with the inner space of the piston rod. At least one of the cap and the support member is provided with a communication path through which the upper portion space communicates with the upper space.

[2] The suspension apparatus may provide that the cap has an abutting surface against which an upper end surface of the support member abuts. The communication path has an upward concave portion that is concave upward from the abutting surface of the cap. The suspension apparatus further includes a non-return valve that is arranged between the abutting surface of the cap and the upper end surface of the support member. The non-return valve allows flow of air from the upper portion space to the upper space through the communication path, and suppresses flow of air from the upper space to the upper portion space.

[3] The suspension apparatus may provide that the communication path is a communication hole that is formed in a portion of the support member which is below the cap, and the upper portion space communicates with the upper space through the communication path. Rubber is arranged around the support member in the upper space.

[4] The suspension apparatus may provide that the piston retains a dividing member that divides the lower space into an upper positioning space which is a space positioned above the dividing member and a lower positioning space which is a space positioned below the dividing member, and the piston has a space communication hole that is a hole to communicate the upper positioning space with the lower positioning space. The suspension apparatus further includes an adjustment mechanism that adjusts the rate of a fluid passing through the space communication hole of the piston. An operation portion operating the adjustment mechanism is arranged inside the upper portion space.

With the configuration of [1], the through-hole is formed in a portion of the inner tube which is below the partition wall member in order for the annular oil chamber to communicate with the lower space. The inner space of the piston rod is a space inside the piston rod and communicates with the lower space. The support member is a cylindrical member and forms the upper portion space between the cap and the support member, and the upper portion space communicates with the inner space of the piston rod. At least one of the cap and the support member is provided with the communication path through which the upper portion space communicates with the upper space. For this reason, it is possible to suppress occurrence of an impulse sound caused by occurrence of air bubble entrapment in a space in which air is present and in which pressure increases during extension operation.

With the configuration of [2], the cap has the abutting surface against which the upper end surface of the support member abuts. The communication path is configured to contain the upward concave portion that is concave upward from the abutting surface of the cap. The non-return valve that is arranged between the abutting surface of the cap and the upper end surface of the support member, allows flow of air from the upper portion space to the upper space through the communication path, and suppresses flow of air from the upper space to the upper portion space. Accordingly, during extension operation, it is possible to discharge air bubbles from a space in which air is present and in which pressure increases during extension operation, and during compression operation, it is possible to suppress suction of air into the space.

With the configuration of [3], the communication path is a communication hole that is formed in the portion of the support member which is below the cap, and the upper portion space communicates with the upper space through the communication path. The rubber is arranged around the support member in the upper space. Accordingly, during extension operation, it is possible to discharge air bubbles from the space in which air is present and in which pressure increases during extension operation, and during compression operation, it is possible to suppress the suction of air into the space.

With the configuration of [4], the piston retains the dividing member that divides the lower space into the upper positioning space which is a space positioned above the dividing member and the lower positioning space which is a space positioned below the dividing member, and the piston has the space communication hole that is a hole through which the upper positioning space communicates with the lower positioning space, and thus, even in a configuration where the suspension apparatus further includes the adjustment mechanism that adjusts the rate of a fluid passing through the space communication hole of the piston, and the operation portion for operation of the adjustment mechanism is arranged inside the upper portion space, it is possible to suppress occurrence of the impulse sound caused by occurrence of the air bubble entrapment in the space in which the operation portion is arranged.

BRIEF DESCRIPTION OF DRAWINGS

FIGS. 8A and 8B are views illustrating operation of a compression stroke.

FIG. 9A is a view illustrating cross-sections of a cap, a support member, a stopper rubber and an outer tube.

FIG. 9B is a cross-sectional view of a portion IX-IX in FIG. 9A.

DESCRIPTION OF EMBODIMENTS

Hereinafter, embodiments of the invention will be described in detail with reference to the accompanying drawings.

Figure 1:
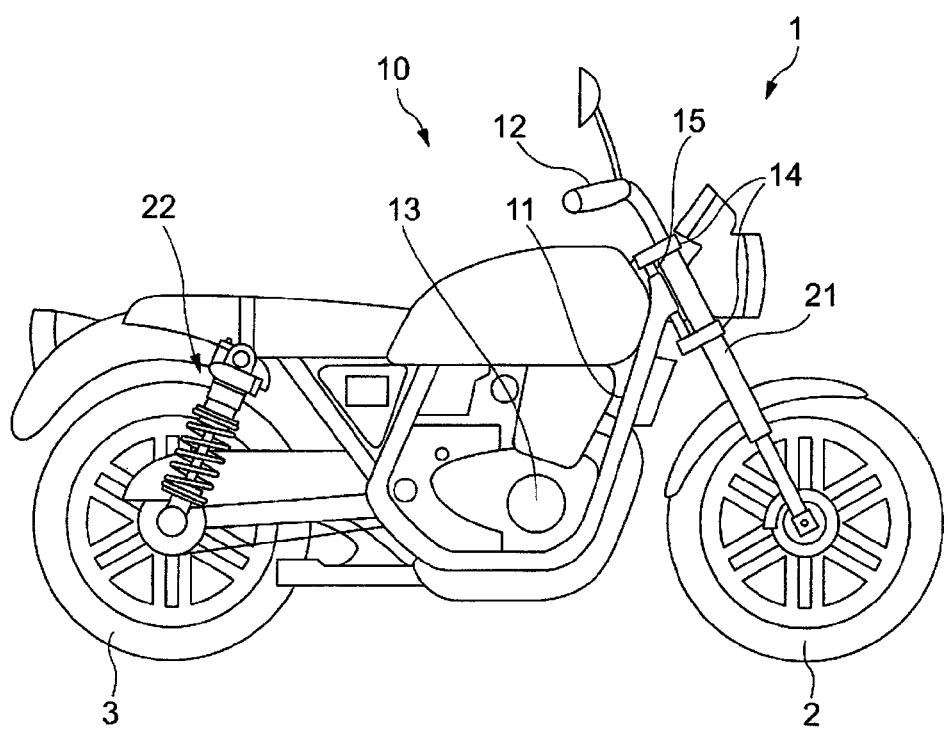
FIG. 1 is a view illustrating a schematic configuration of a motorcycle according to an embodiment.

FIG. 1 is a view illustrating a schematic configuration of a motorcycle 1 according to the embodiment.

The motorcycle 1 includes a front wheel 2 that is a wheel on a front side; a rear wheel 3 that is a wheel on a rear side; and a main vehicle body 10 having a vehicle frame 11 that is a skeleton of the motorcycle 1, a handlebar 12, an engine 13 and the like. In addition, a front fork 21 is an example of a suspension apparatus that connects the front wheel 2 to the main vehicle body 10. The motorcycle 1 has a front fork 21 on each of the left and the right sides of the front wheel 2. The motorcycle 1 has a rear suspension 22 on each of the left and the right sides of the rear wheel 3, and the rear suspensions 22 connect the rear wheel 3 to the main vehicle body 10. FIG. 1 illustrates only the front fork 21 and the rear suspension 22 that are arranged on the right side. In addition, the motorcycle 1 includes two brackets 14 that retain the front forks 21 arranged on both of the left and the right sides of the front wheel 2, and a shaft 15 that is arranged between two brackets 14. The shaft 15 is rotatably supported by the vehicle frame 11.

Subsequently, the front fork 21 will be described in detail.

Figure 2:
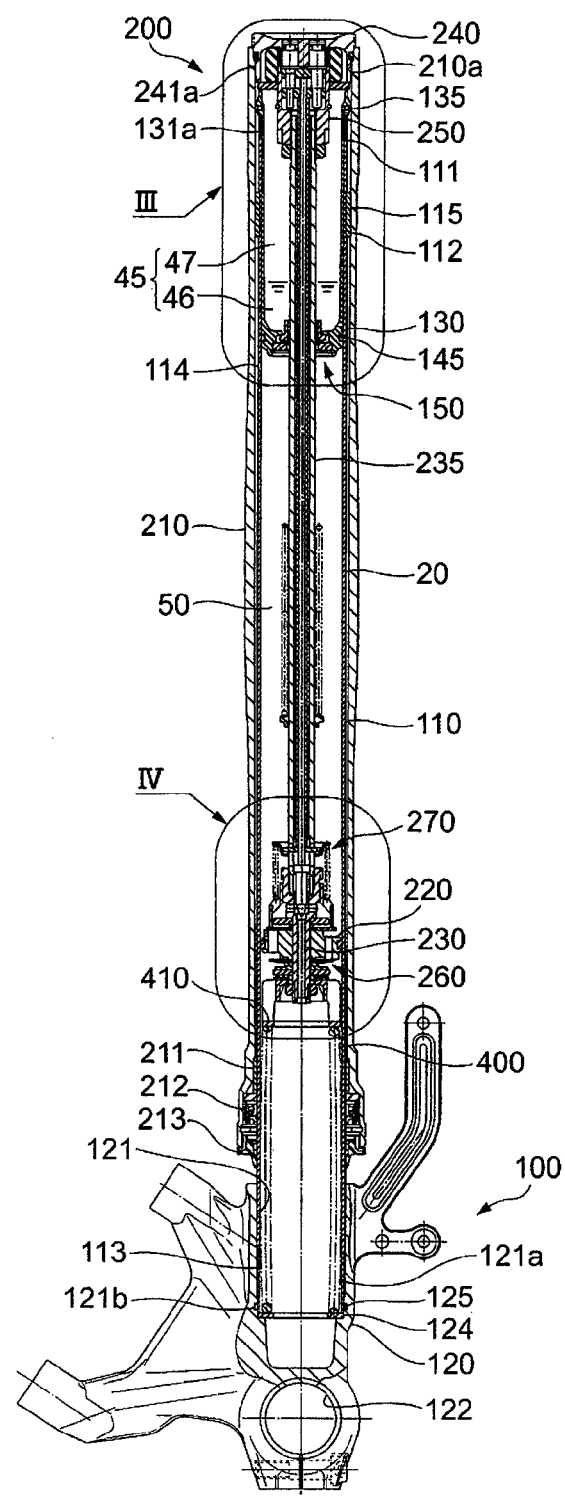
FIG. 2 is a cross-sectional view of a front fork according to the embodiment of the invention.

FIG. 2 is a cross-sectional view of the front fork 21 according to the embodiment of the invention.

Figure 3:
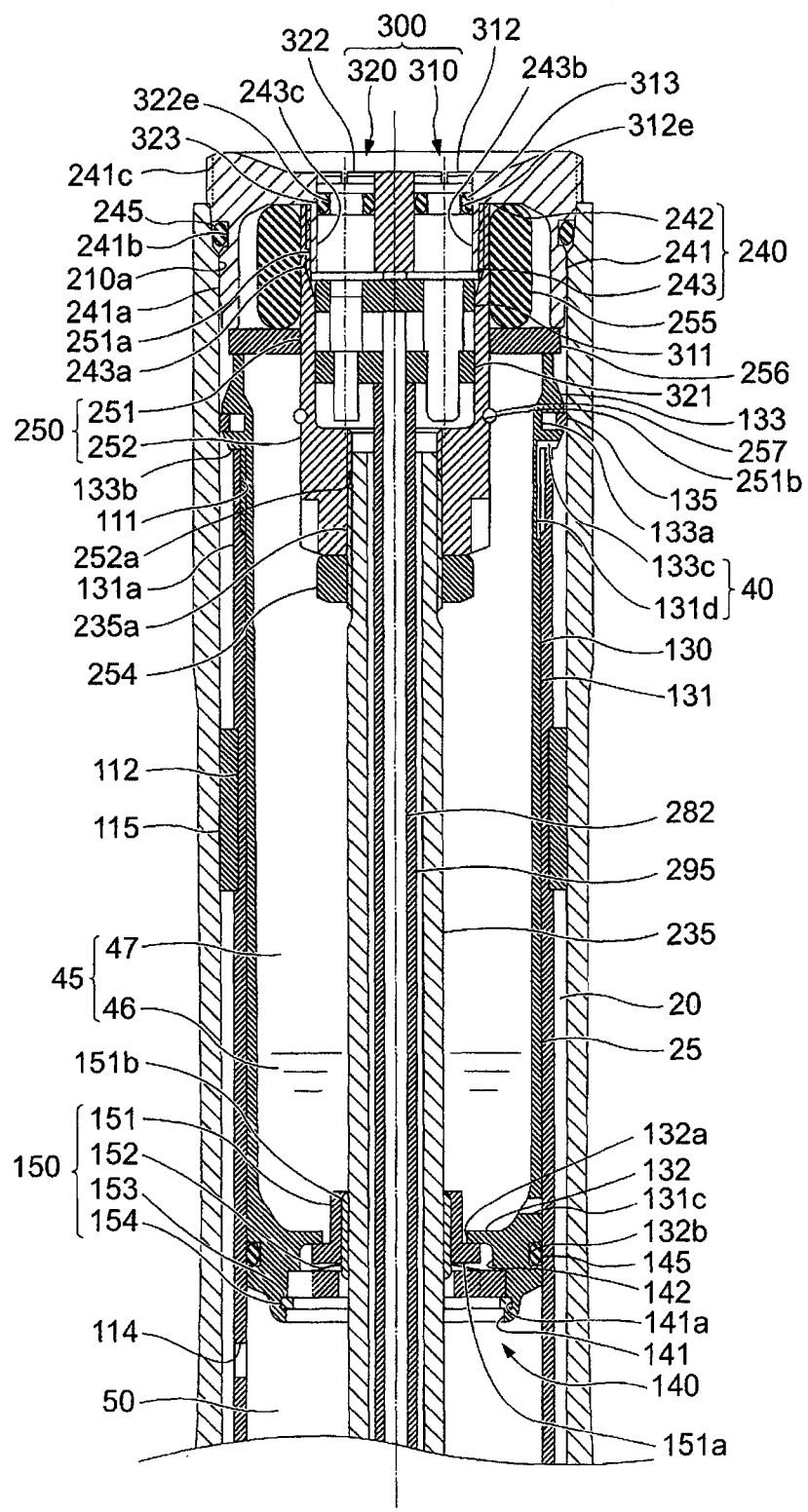
FIG. 3 is an enlarged view of a portion III in FIG. 2.

FIG. 3 is an enlarged view of a portion III in FIG. 2.

Figure 4:
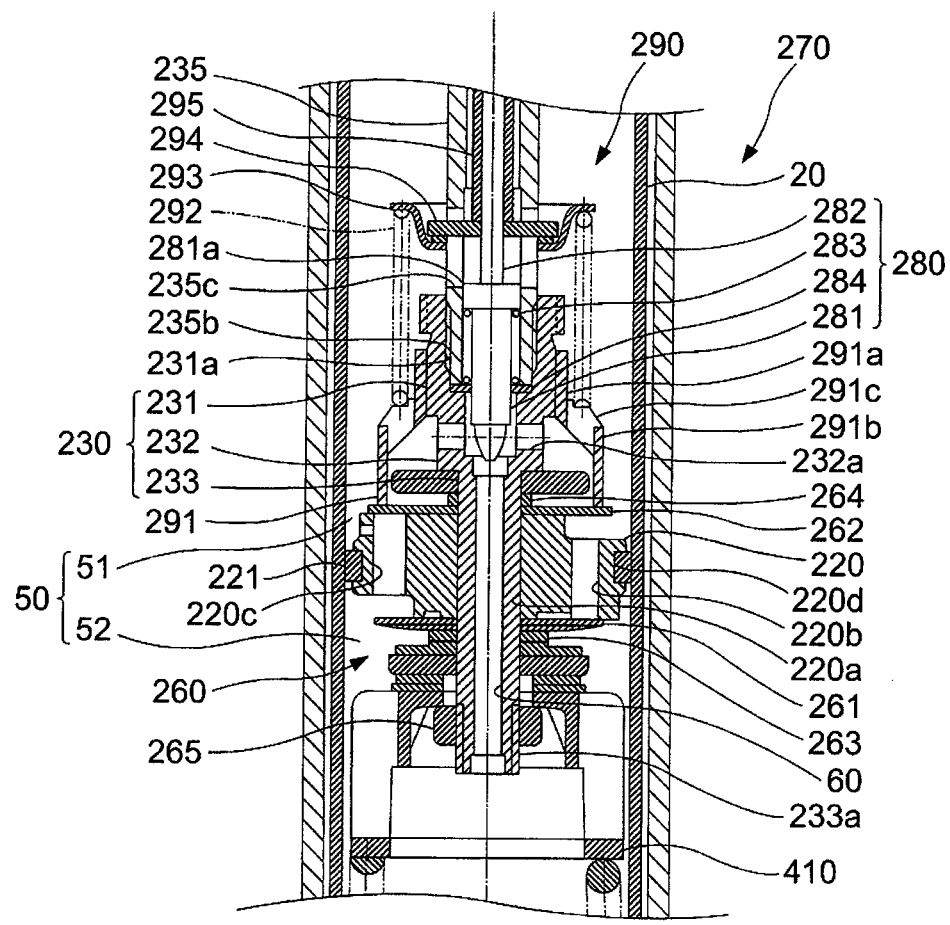
FIG. 4 is an enlarged view of a portion IV in FIG. 2.

FIG. 4 is an enlarged view of a portion IV in FIG. 2.

Figure 5:
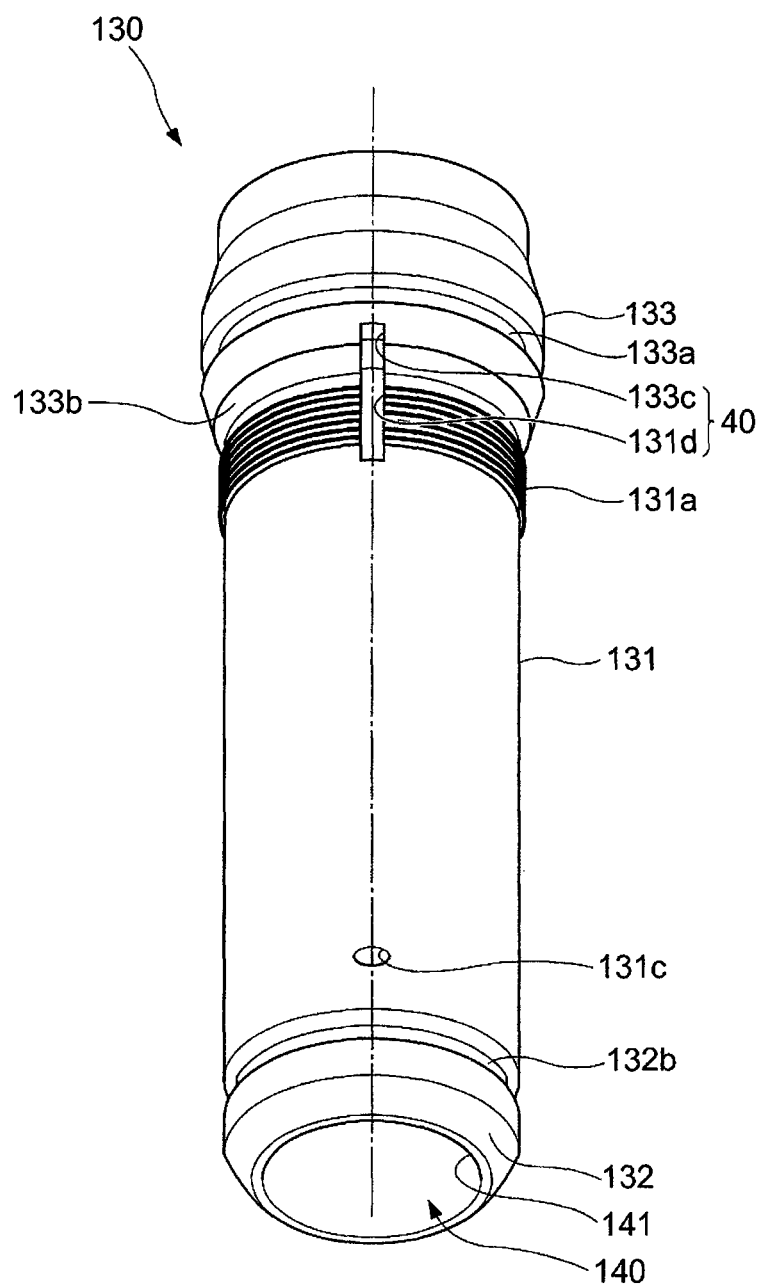
FIG. 5 is a perspective view when a rod guide case is seen from below.

FIG. 5 is a perspective view when a rod guide case 130 to be described later is seen from below.

The front fork 21 according to the embodiment is arranged between the main vehicle body 10 and front wheel 2 of the motorcycle 1 to support the front wheel 2, and the front fork 21 is a so-called inverted front fork in which an inner tube 110 and an outer tube 210 to be described later are arranged on a side of the front wheel 2 and a side of the main vehicle body 10, respectively.

The front fork 21 includes an axle side unit 100 that has the inner tube 110 and is mounted to an axle of the front wheel 2; and a main body side unit 200 that has the outer tube 210 and is mounted to the main vehicle body 10. In addition, the front fork 21 includes a coil spring 400 that is arranged between the axle side unit 100 and the main body side unit 200 and absorbs vibration exerted on the front wheel 2 due to road surface roughness; and a spring support member 410 that supports the coil spring 400 together with a lower spring receiver 124 to be described later.

The inner tube 110 and the outer tube 210 are substantially cylindrical members that are arranged coaxially with each other, and there is a case where a direction of the center line (axial direction) of the cylinder is referred to as a "vertical direction" and the side of the main vehicle body 10 and the side of the front wheel 2 are referred to as an upper side and a lower side, respectively. The axle side unit 100 and the main body side unit 200 move in the vertical direction (axial direction) relatively with each other, and thus the front fork 21 absorbs road surface roughness to suppress vibration while the front fork 21 supports the front wheel 2.

Configuration of Axle Side Unit 100

The axle side unit 100 includes the substantially cylindrical inner tube 110 of which both ends are open; an axle bracket 120 that is mounted to an end portion (lower end portion) on a lower side of the inner tube 110 and the front wheel 2; and an oil seal 125 that seals a gap between the inner tube 110 and the axle bracket 120. In addition, the axle side unit 100 includes the rod guide case 130 that is mounted to an end portion (upper end portion) on an upper side of the inner tube 110 to guide movement of a piston rod 235 of the main body side unit 200 to be described later; an oil ring 135 that seals a gap between the rod guide case 130 and the outer tube 210; and a supply and discharge apparatus 150 that adjusts the circulation of oil between the inside and outside of the rod guide case 130.

Configuration of Inner Tube 110

The inner tube 110 is formed to have the outer diameter smaller than the inner diameter of the outer tube 210, and in a state where the inner tube 110 enters the outer tube 210, an annular oil chamber 20 is formed between an outer circumferential surface of the inner tube 110 and an inner circumferential surface of the outer tube 210.

The inner tube 110 has an inner diameter uniformly formed in an inner circumferential surface thereof along the vertical direction so that a piston 220 of the main body side unit 200 to be described later smoothly slides. Besides, a female screw 111 is formed in the inner circumferential surface of the upper end portion, and a male screw 131a of the rod guide case 130 to be described later is tightened into the female screw 111. Meanwhile, the inner tube 110 has an outer diameter uniformly formed in the outer circumferential surface thereof basically along the vertical direction, and a concave portion 112 is formed over the entire circumference of the upper end portion. In addition, the inner tube 110 has a male screw 113 formed in an outer circumferential surface of the lower end portion, and the male screw 113 is tightened into the female screw 121a of the axle bracket 120 to be described later. In addition, a communication hole 114 is formed in a portion of the inner tube 110 which is below the rod guide case 130 in a state where the rod guide case 130 is mounted to the inner tube 110, and the inside of the inner tube 110 communicates with the annular oil chamber 20 through the communication hole 114.

A slide bush 115 is fitted to the aforementioned concave portion 112 so that the inner tube 110 smoothly slides on the inner circumferential surface of the outer tube 210. The slide bush 115 is a bearing that is formed into a cylindrical shape, and in a state where the slide bush 115 is mounted on the inner tube 110, the slide bush 115 is set to have an outer diameter larger than that of the inner tube 110 in such a manner that an outer circumferential surface of the slide bush 115 protrudes outward from the outer circumferential surface of the inner tube 110.

A predetermined amount of oil is poured into the inner tube 110.

Configuration of Axle Bracket 120

As illustrated in FIG. 2, the axle bracket 120 has a concave portion 121 into which the inner tube 110 is inserted; and an axle mounting hole 122 into which the axle of the front wheel 2 can be mounted. The concave portion 121 of the axle bracket 120 has the female screw 121a into which the male screw 113 is tightened; and a seal groove 121b in which the oil seal 125 is fitted to seal a gap between the outer circumferential surface of the inner tube 110 and the concave portion 121. In addition, the lower spring receiver 124 is mounted in the concave portion 121, and a lower end portion of the coil spring 400 is placed on the lower spring receiver 124 that receives a spring load.

When the male screw 113 of the inner tube 110 is tightened into the female screw 121a, the axle bracket 120 is mounted to block an opening of the lower end portion of the inner tube 110. The oil seal 125 fitted into the seal groove 121b of the concave portion 121 seals the gap between the outer circumferential surface of the inner tube 110 and the axle bracket 120, and thus oil poured into the inner tube 110 is prevented from leaking.

Configuration of Rod Guide Case 130

As illustrated in FIGS. 3 and 5, the rod guide case 130 includes a cylindrical portion 131 which is formed in such a manner that a direction of the center line thereof is the vertical direction; an inward portion 132 that is provided below an lower end portion of the cylindrical portion 131 and is formed to face inward in a radial direction so that the inward portion 132 blocks an opening of the lower end portion; and an outward portion 133 that is formed to face outward in the radial direction above an upper end portion of the cylindrical portion 131.

The male screw 131a is formed in an outer circumferential surface of the upper end portion of the cylindrical portion 131, and the male screw 131a is tightened into the female screw 111 formed in the inner tube 110. In a portion below the male screw 131a, the cylindrical portion 131 is formed to have an outer diameter smaller than the inner diameter of the inner tube 110, and in a state where the rod guide case 130 is mounted to the inner tube 110, an annular gap 25 (refer to FIGS. 7A and 7B as well) is formed between an outer circumferential surface of the cylindrical portion 131 and the inner circumferential surface of the inner tube 110. In addition, a communication hole 131c is formed in the lower end portion of the cylindrical portion 131 in order for the inside of the cylindrical portion 131 to communicate with the outside thereof. In addition, a cylindrical portion side concave portion 131d that is concave inward is formed in an outer circumferential surface of the upper end portion of the cylindrical portion 131, and the cylindrical portion side concave portion 131d is formed in the vertical direction from the top of the male screw 131a to the bottom thereof and in a circumferential direction at a position corresponding to a position of an outward portion side concave portion 133c to be described later.

The inward portion 132 has a valve chamber 140 formed in a center portion using a through-hole that passes through the inward portion 132 in the vertical direction. The supply and discharge apparatus 150 is arranged in the valve chamber 140. In addition, a seal groove 132b is formed in an outer circumferential surface of the inward portion 132, and an oil seal 145 is fitted to the seal groove 132b to seal a gap between the outer circumferential surface of the inward portion 132 and the inner circumferential surface of the inner tube 110.

The valve chamber 140 is configured to have a through-hole 132a that passes through the inward portion 132; and a first concave portion 141 and a second concave portion 142 that are concave from a lower end surface of the inward portion 132. The first concave portion 141 and the second concave portion 142 are different columnar concavities from each other in such a manner that a diameter decreases from the lower end surface to an upper end surface, and the first concave portion 141 is a columnar concave portion of a large diameter and the second concave portion 142 is a columnar concave portion of a small diameter. In addition, a groove 141a is formed over the entire circumference of an inner circumferential surface of the first concave portion 141, and the groove 141a is concave outward from the inner circumferential surface.

A ring groove 133a is formed over the circumferential entirety of an outer circumferential surface of the outward portion 133, and the oil ring 135 is fitted to the ring groove 133a to seal a gap between the inner circumferential surface of the outer tube 210 and the rod guide case 130. The oil ring 135 inserted into the ring groove 133a functions as a member that defines an upper portion of the aforementioned annular oil chamber 20.

A lower end surface 133b of the outward portion 133 functions as an abutting surface against which an upper end surface of the inner tube 110 abuts. That is, the lower end surface 133b of the outward portion 133 is formed in a surface orthogonal to the vertical direction, and the lower end surface 133b is in contact with the entire circumference of the upper end surface of the inner tube 110 and tightly seals an inner space of the inner tube 110. The outward portion side concave portion 133c that is concave upward from the lower end surface 133b is formed as a partial circumferential area in the outward portion 133 at a position corresponding to a position of the cylindrical portion side concave portion 131d in the cylindrical portion 131. In other words, as illustrated in FIGS. 3 and 5, the outward portion side concave portion 133c and the cylindrical portion side concave portion 131d are continuously formed and function as a communication path 40 that is a communication path through which the annular oil chamber 20 communicates with the annular gap 25.

In the rod guide case 130 having the aforementioned configuration, the inward portion 132 divides a space in the inner tube 110 into a space above the inward portion 132 and a space below the inward portion 132. In addition, the cylindrical portion 131 divides the space above the inward portion 132 into a space inside the cylindrical portion 131 and a space outside the cylindrical portion 131. A portion above the inward portion 132 and inside the cylindrical portion 131 functions as an oil reservoir chamber 45 in which oil is stored. In addition, the space below the inward portion 132 and inside the inner tube 110 functions as a working oil chamber 50 in which oil is stored to generate main damping force. In addition, a portion above the inward portion 132 and outside the cylindrical portion 131 is the aforementioned annular gap 25. The oil seal 145 which is fitted to the seal groove 132b formed in the inward portion 132 divides the annular gap 25 from the working oil chamber 50.

In other words, the rod guide case 130 retaining the oil ring 135 and the oil seal 145 is mounted to the upper end portion of the inner tube 110 to define an upper end portion of the annular oil chamber 20 that is formed between the inner circumferential surface of the outer tube 210 and the outer circumferential surface of the inner tube 110. The rod guide case 130 has, as an example of a bowl portion that is formed into a bowl shape, the cylindrical portion 131 and the inward portion 132 inside the inner tube 110, and the rod guide case 130 functions as a partition wall member that divides the space inside the inner tube 110 into the oil reservoir chamber 45 as an example of an upper space of the cylindrical portion 131 and the inward portion 132 and the working oil chamber 50 and the annular gap 25 as examples of a lower space. The rod guide case 130 retaining the oil ring 135 and the oil seal 145 divides the working oil chamber 50 and the annular gap 25 as the examples of the lower space into the annular gap 25 as an example of a gap space between the rod guide case 130 and the inner tube 110 and the working oil chamber 50 as an example of a space other than the annular gap 25. In the rod guide case 130, the communication hole 131c is formed in order for the oil-containing oil reservoir chamber 45 to communicate with the annular gap 25, and the communication path 40 is provided in order for an upper portion of the annular oil chamber 20 to communicate with the annular gap 25.

An upper space of the oil reservoir chamber 45 inside the inner tube 110 is connected to an upper space inside the outer tube 210, and both of the spaces are filled with air. A lower portion of the oil reservoir chamber 45 functions as an oil chamber 46 in which oil poured into the inner tube 110 is stored, and the upper space of the oil reservoir chamber 45 and the upper space inside the outer tube 210 function as an air chamber 47.

Configuration of Supply and Discharge Apparatus 150

As illustrated in FIG. 3, the supply and discharge apparatus 150 includes a check valve 151 that allows the flow of oil from the oil reservoir chamber 45 to the working oil chamber 50 and prevents the flow of oil from the working oil chamber 50 to the oil reservoir chamber 45; a backup spring 152 that is arranged below the check valve 151; a spring seat 153 which is arranged below the backup spring 152 and on which the backup spring 152 is seated; and a stopper ring 154 that prevents the check valve 151, the backup spring 152 and the spring seat 153 from falling off.

The check valve 151 is a cylindrical member, and a flange 151a is formed in a lower end portion of the check valve 151. A cylindrical bush 151b is press-fitted into an inner circumference of the check valve 151 to slidably support the piston rod 235. The flange 151a is arranged in the second concave portion 142 of the valve chamber 140, and the check valve 151 moves in the vertical direction along an outer circumference of the piston rod 235 in such a manner that an upper end surface of the flange 151a is in contact with a bottom portion (upper end surface) of the second concave portion 142, or the upper end surface of the flange 151a is apart from the bottom portion of the second concave portion 142.

For example, the backup spring 152 is a disc spring-like member, and in a state where the backup spring 152 is seated on the spring seat 153, the backup spring 152 is in contact with a lower end surface of the flange 151a of the check valve 151 at a plurality of circumferential locations in an inner circumferential or outer circumferential portion thereof.

The spring seat 153 is a disc-shaped member and a hole is formed in a center portion thereof. Concave and convex portions are alternately formed in a circumferential direction, and the concave and convex portions are concave and convex in a radial direction in an outer circumferential portion of the spring seat 153. The spring seat 153 is arranged in the first concave portion 141 of the valve chamber 140 and oil circulates through the concave portions formed on the outer circumferential portion.

The stopper ring 154 is a C-shaped retaining ring and is fitted into the groove 141a formed in an inner circumferential surface of the first concave portion 141 of the valve chamber 140. The stopper ring 154 is arranged below the spring seat 153 to support the spring seat 153 from below.

Configuration of Main Body Side Unit 200

As illustrated in FIG. 2, the main body side unit 200 includes a substantially cylindrical outer tube 210 of which both ends are open; a guide bush 211 that is mounted to a side of a lower end portion (lower end portion) of the outer tube 210; an oil seal 212 that is mounted below the guide bush 211; and a dust seal 213 that is mounted below the oil seal 212.

In addition, the main body side unit 200 includes the piston 220 that slides in the working oil chamber 50 formed in the inner space of the inner tube 110; a piston bolt 230 that retains the piston 220; and the piston rod 235 that retains the piston bolt 230 in a lower end portion thereof.

In addition, the main body side unit 200 includes a cap 240 that is mounted to a side of an upper end portion (upper end portion) of the outer tube 210 to block an upper opening portion; a support member 250 that is mounted to the cap 240 to support an upper end portion of the piston rod 235. In addition, the main body side unit 200 includes a cylindrical stopper rubber 255 that is arranged in an annular concave portion formed by an inner circumference of a cylindrical portion 241 of the cap 240 to be described later and an outer circumference of a first cylindrical portion 251 of the support member 250; a disc-shaped stopper plate 256 that is arranged below the stopper rubber 255; and a stopper ring 257 that is arranged below the stopper plate 256.

In addition, the main body side unit 200 includes a damping force generating apparatus 260 that generates a damping force using viscous resistance of oil; and a clamping force adjusting apparatus 270 that adjusts a damping force of the damping force generating apparatus 260. In addition, the main body side unit 200 includes the spring support member 410 that supports the coil spring 400 together with the lower spring receiver 124.

Configuration of Outer Tube 210

As illustrated in FIG. 2, the outer tube 210 is a substantially cylindrical member. The lower end portion of the outer tube 210 is expanded in diameter in such a manner that the guide bush 211, the oil seal 212 and the dust seal 213 can be retained thereinside. A female screw 210a is formed in an inner circumferential surface of the upper end portion thereof, and a male screw 241a formed in the cap 240 is tightened into the female screw 210a.

The guide bush 211 is a member that helps smooth sliding between the inner circumferential surface of the outer tube 210 and an outer circumferential surface of the inner tube 110. The guide bush 211 is a bearing that is formed into a cylindrical shape. In a state where the guide bush 211 is mounted to the outer tube 210, the guide bush 211 is set to have an inner diameter smaller than that of outer tube 210 in such a manner that an inner circumferential surface of the guide bush 211 protrudes inward from the inner circumferential surface of the outer tube 210. The guide bush 211 functions as a member that defines a lower portion of the aforementioned annular oil chamber 20.

The oil seal 212 prevents the working oil which leaks out of the guide bush 211 during mutual sliding of the outer tube 210 and the inner tube 110 from flowing to the outside.

The dust seal 213 suppresses intrusion of foreign substances such as water or dust into the front fork 21 from the outside.

Configuration of Piston 220

As illustrated in FIG. 4, the piston 220 is a cylindrical member that has a plurality of oil paths formed in the vertical direction. More specifically, the piston 220 has a bolt hole 220a which passes in the vertical direction through a center portion thereof and through which a third cylindrical portion 233 of the piston bolt 230 to be described later passes; a first oil path 220b that is configured by a hole which passes in the vertical direction through a portion farther radially outside than the bolt hole 220a; and a second oil path 220c that is configured by a hole which passes in the vertical direction through a portion farther radially outside than the first oil path 220b. In addition, a ring groove 220d is formed over the circumferential entirety of an outer circumferential surface of the piston 220, and an oil ring 221 is fitted to the ring groove 220d to seal a gap between the outer circumferential surface of the piston 220 and the inner circumferential surface of the inner tube 110. The oil ring 221 fitted to the ring groove 220d divides the working oil chamber 50 into a piston rod side oil chamber 51 as an example of the upper positioning space that is an oil chamber which is positioned above the oil ring 221 and in which the piston rod 235 is present; and a piston side oil chamber 52 that is an oil chamber as an example of the lower positioning space which is positioned below the oil ring 221. That is, the piston 220 retaining the oil ring 221 divides the working oil chamber 50 into the piston rod side oil chamber 51 and the piston side oil chamber 52. The aforementioned first oil path 220b and the second oil path 220c function as communication paths through which the piston rod side oil chamber 51 communicates with the piston side oil chamber 52. The piston 220 configures a part of the damping force generating apparatus 260. The damping force generating apparatus 260 will be in detail described later.

Configuration of Piston Bolt 230

As illustrated in FIG. 4, the piston bolt 230 has a first cylindrical portion 231 that has a cylindrical shape; a second cylindrical portion 232 that has a cylindrical shape and is formed to extend downward from a lower end portion of the first cylindrical portion 231; and the third cylindrical portion 233 that has a cylindrical shape and is formed to extend downward from a lower end portion of the second cylindrical portion 232. A female screw 231a is formed in an inner circumferential surface of the first cylindrical portion 231, and a male screw 235b to be described later formed in the piston rod 235 is tightened into the female screw 231a. In addition, a male screw 233a is formed in a lower end portion of the third cylindrical portion 233. In addition, a through-hole 232a is formed in the second cylindrical portion 232 in a radial direction (a direction orthogonal to the vertical direction) in order for the inside of the second cylindrical portion 232 to communicate with the outside thereof. The through-hole 232a and an inner portion of the third cylindrical portion 233 function as a bypass 60 that bypasses the first oil path 220b and second oil path 220c formed in the piston 220 in order for the piston rod side oil chamber 51 to communicate with the piston side oil chamber 52.

Configuration of Piston Rod 235

The piston rod 235 is a cylindrical member. As illustrated in FIG. 3, a male screw 235a is formed in an outer circumferential surface of the upper end portion, and the male screw 235a is tightened into a female screw 252a to be described later formed in the support member 250. As illustrated in FIG. 4, the male screw 235b is formed in an outer circumferential surface of a lower end portion of the piston rod 235, and the male screw 235b is tightened into the female screw 231a formed in the piston bolt 230. In addition, in the piston rod 235, a through-hole 235c is formed in a radial direction in a portion above the male screw 235b in order for the inside of the piston rod 235 to communicate with the outside thereof. When the through-hole 235c is seen in a direction orthogonal to the vertical direction, the through-hole 235c is formed into an oblong hole shape that is long in the vertical direction. In addition, the through-holes 235c are formed at 180 degree intervals circumferentially in an outer circumferential surface of the piston rod 235.

When the piston rod 235 has an outer diameter Do in the outer circumferential surface, an area of $\pi Do^2/4$ is referred to as "a cross-sectional area of the piston rod 235" hereinafter. The cross-sectional area of the piston rod 235 according to the embodiment is set to be smaller than a cross-sectional area (an area of a cross-section cut by a surface orthogonal to the vertical direction) of the annular oil chamber 20.

Configuration of Cap 240

As illustrated in FIG. 3, the cap 240 has the cylindrical portion 241 that has a cylindrical shape; an inward portion 242 that is provided in an upper end portion of the cylindrical portion 241 and is formed inward in a radial direction to block an opening; and a columnar portion 243 that has a columnar shape and protrudes downward from a lower end surface of a center portion of the inward portion 242.

The male screw 241a and a seal groove 241b are formed in an outer circumferential surface of the cylindrical portion 241. The male screw 241a is tightened into the female screw 210a formed in the inner circumferential surface of the outer tube 210, and a seal member 245 is fitted to the seal groove 241b to seal a gap between the outer circumferential surface of the cylindrical portion 241 and the inner circumferential surface of the outer tube 210 in a portion above the male screw 241a. In addition, a protrusion portion 241c is provided above the seal groove 241b in the outer circumferential surface of the cylindrical portion 241, and the protrusion portion 241c protrudes in a radial direction outward from the outer circumferential surface of the cylindrical portion 241.

A male screw 243a is formed in an outer circumferential surface of the columnar portion 243, and the male screw 243a is tightened into a female screw 251a formed in the support member 250. Through-holes 243b and 243c are formed to pass in the vertical direction through the inward portion 242 and the columnar portion 243, and a first adjusting bolt 312 and a second adjusting bolt 322 to be described later are inserted into the through-hole 243b and the through-hole 243c, respectively.

When the male screw 241a formed in the outer circumferential surface of the cylindrical portion 241 is tightened into the female screw 210a formed in the inner circumferential surface of the outer tube 210, the cap 240 is mounted on the outer tube 210. The seal member 245 is fitted to the seal groove 241b formed in the cylindrical portion 241 to seal the outer tube 210.

Configuration of Support Member 250

As illustrated in FIG. 3, the support member 250 has the first cylindrical portion 251 that has a thin-wall cylindrical shape; and a second cylindrical portion 252 that is formed into a cylindrical shape below the first cylindrical portion 251 and has a wall thicker than the wall of the first cylindrical portion 251. The female screw 251a is formed in an inner circumferential surface of the first cylindrical portion 251, and the male screw 243a formed in the cap 240 is tightened into the female screw 251a. A ring groove 251b to which the stopper ring 257 is fitted is formed in an outer circumferential surface of the first cylindrical portion 251. In addition, the female screw 252a is formed in an inner circumferential surface of the second cylindrical portion 252, and the male screw 235a formed in the piston rod 235 is tightened into the female screw 252a.

When the female screw 251a of the first cylindrical portion 251 is tightened onto the male screw 243a of the cap 240, the support member 250 is retained by the cap 240. When the male screw 235a formed in the piston rod 235 is tightened into the female screw 252a of the second cylindrical portion 252, the piston rod 235 is retained by the second cylindrical portion 252. Furthermore, when a lock nut 254 is tightened toward the support member 250, the piston rod 235 is fixed to not only the support member 250 but also the cap 240.

When the male screw 243a of the cap 240 is tightened into the female screw 251a of the first cylindrical portion 251 of the support member 250, the male screw 243a is tightened into the female screw 251a until an upper end surface of the first cylindrical portion 251 abuts against a lower end surface of the inward portion 242 of the cap 240. Accordingly, the lower end surface of the inward portion 242 of the cap 240 functions as an abutting surface against which an upper end surface of the support member 250 abuts.

Configuration of Stopper Rubber 255 and the Like

As illustrated in FIG. 3, the stopper rubber 255 is a cylindrical member that is molded of an elastic member such as rubber. The stopper rubber 255 is arranged in an annular concave portion that is formed by an inner circumference of the cylindrical portion 241 of the cap 240 and an outer circumference of the first cylindrical portion 251 of the support member 250.

The stopper plate 256 is a disc-shaped member that has a hole in a center portion thereof, and the first cylindrical portion 251 of the support member 250 passes through the hole.

The stopper ring 257 is a C-shaped retaining ring and is fitted to the ring groove 251b formed in the first cylindrical portion 251 of the support member 250. The stopper ring 257 prevents the stopper rubber 255 and the stopper plate 256 from falling off.

When the front fork 21 is compressed, an upper end portion of the axle side unit 100 abuts against the stopper plate 256 and the stopper plate 256 abuts against the lower end surface of the cylindrical portion 241 of the cap 240, and thus upward movement of the axle side unit 100 is limited. At this time, since the stopper rubber 255 is elastically deformed, an impact is mitigated at the time the stopper plate 256 abuts against the lower end surface of the cylindrical portion 241 of the cap 240.

Configuration of Damping Force Generating Apparatus 260

As illustrated in FIG. 4, the damping force generating apparatus 260 includes the aforementioned piston 220; a first valve 261 that is arranged below the piston 220 to block a lower end portion of the first oil path 220b formed in the piston 220; a second valve 262 that is arranged above the piston 220 to block an upper end portion of the second oil path 220c formed in the piston 220; a first washer 263 that is arranged below the first valve 261; and a second washer 264 that is arranged above the second valve 262.

As illustrated in FIG. 4, when a lock nut 265 is tightened onto the male screw 233a formed in the third cylindrical portion 233 of the piston bolt 230, the piston 220, the first valve 261, the second valve 262, the first washer 263 and the second washer 264 together with the spring support member 410 and the like are mounted while being interposed between the lock nut 265 and a lower end surface of the second cylindrical portion 232 of the piston bolt 230.

Configuration of Damping Force Adjusting Apparatus 270

The damping force adjusting apparatus 270 includes a first adjustment mechanism 280 that adjusts a flow rate of oil which circulates between the piston rod side oil chamber 51 and the piston side oil chamber 52 through the bypass 60 formed in the piston bolt 230; a second adjustment mechanism 290 that adjusts a damping force due to bending deformation of the second valve 262; and an operation portion 300 that operates adjustment of the first adjustment mechanism 280 and the second adjustment mechanism 290.

As illustrated in FIG. 4, the first adjustment mechanism 280 includes a needle valve 281 that adjusts the circulation area of the bypass 60; a first push rod 282 that exerts a downward force on the needle valve 281; a coil spring 283 that exerts an upward force on the needle valve 281; and a spring seat 284 that supports a lower end portion of the coil spring 283.

The needle valve 281 is a columnar member which has a flange portion 281a in an upper end portion thereof and of which a lower end portion is sharply pointed, and the needle valve 281 is inserted inside the piston rod 235. The first push rod 282 is a cylindrical or columnar member that is arranged inside a second push rod 295 to be described later. The coil spring 283 is arranged in the vertical direction between a lower end surface of the flange portion 281a of the needle valve 281 and the spring seat 284, and the coil spring 283 is mounted in a radial direction between an inner circumferential surface of the piston rod 235 and an outer circumferential surface of the needle valve 281. The spring seat 284 is a disc-shaped member that has a hole in a center portion thereof, and the needle valve 281 passes through the hole. The spring seat 284 seals a gap between an inner circumferential surface of the piston bolt 230 and the outer circumferential surface of the needle valve 281.

The second adjustment mechanism 290 includes a valve opening suppression member 291 that is arranged above the second valve 262 to suppress the opening of the second valve 262; a coil spring 292 that is arranged above the valve opening suppression member 291 to exert a downward force on the valve opening suppression member 291; and a spring receiver 293 that is arranged above the coil spring 292 to interpose the coil spring 292 between the valve opening suppression member 291 and the spring receiver 293. In addition, the second adjustment mechanism 290 includes a push member 294 that exerts a downward force on the spring receiver 293; and the second push rod 295 that exerts a downward force on the push member 294.

The valve opening suppression member 291 has a first cylindrical portion 291a that is provided in an upper portion and has a cylindrical shape; a second cylindrical portion 291b that is provided in a lower portion, has inner and outer diameters larger than those of the first cylindrical portion 291a and has a cylindrical shape; and an intermediate portion 291c that connects the first cylindrical portion 291a and the second cylindrical portion 291b to each other. The first cylindrical portion 291a is fitted around the first cylindrical portion 231 of the piston bolt 230. A lower end surface of the second cylindrical portion 291b is in contact with an upper end surface of the second valve 262. A seat surface on which the coil spring 292 is seated is formed in an upper portion of the intermediate portion 291c. The intermediate portion 291c is provided intermittently in a circumferential direction in order for the outside of the valve opening suppression member 291 to communicate with the bypass 60, and the intermediate portion 291c allows oil to circulate between the piston rod side oil chamber 51 and the piston side oil chamber 52 through the bypass 60.

The spring receiver 293 is a bowl-shaped member that has a hole in a center portion thereof, and the piston rod 235 passes through the hole. A flange provided in an upper end portion of the spring receiver 293 supports an upper end portion of the coil spring 292 and contains the push member 294 thereinside.

The push member 294 is a plate-like member that has a hole in a center portion thereof. The hole is larger than an outer diameter of the first push rod 282 and smaller than an outer diameter of the second push rod 295. The length of the push member 294 is larger than an outer diameter of the piston rod 235. The push member 294 is arranged to move in the vertical direction through the two through-holes 235c formed in the piston rod 235.

The second push rod 295 is a cylindrical member of which an inner diameter is larger than the outer diameter of the first push rod 282 and of which the outer diameter is smaller than an inner diameter of the piston rod 235. The second push rod 295 is arranged between an outer circumferential surface of the first push rod 282 and the inner circumferential surface of the piston rod 235. A lower end portion of the second push rod 295 is in contact with an upper end surface of the push member 294.

As illustrated in FIG. 3, the operation portion 300 includes a first operation portion 310 that moves the first push rod 282 in the vertical direction; and a second operation portion 320 that moves the second push rod 295 in the vertical direction. The first operation portion 310 and the second operation portion 320 are contained in a space that is formed by the cap 240 and the support member 250.

Figure 6:
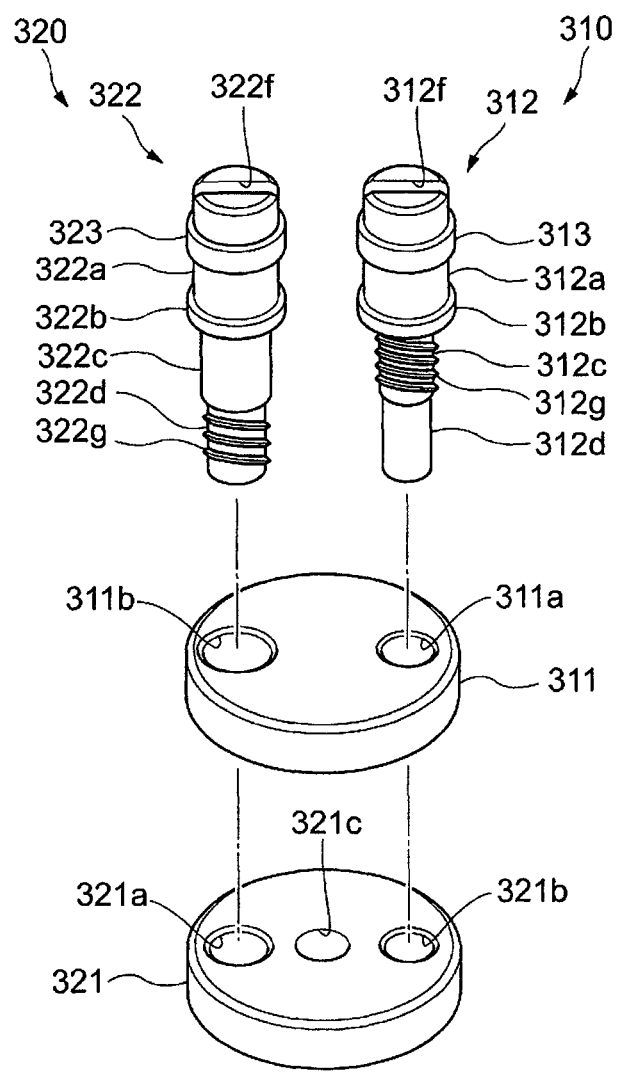
FIG. 6 is a view illustrating a schematic configuration of a first operation portion and a second operation portion.

FIG. 6 is a view illustrating a schematic configuration of the first operation portion 310 and the second operation portion 320.

The first operation portion 310 includes a first adjusting nut 311 that exerts a downward force on the first push rod 282; the first adjusting bolt 312 that is screwed into a female screw 311a formed in the first adjusting nut 311 to move the first adjusting nut 311 in the vertical direction; and an oil seal 313 that seals a gap between the first adjusting bolt 312 and the cap 240.

The second operation portion 320 includes a second adjusting nut 321 that exerts a downward force on the second push rod 295; the second adjusting bolt 322 that is screwed into a female screw 321a formed in the second adjusting nut 321 to move the second adjusting nut 321 in the vertical direction; and an oil seal 323 that seals a gap between the second adjusting bolt 322 and the cap 240.

The first adjusting nut 311 is a disc-shaped member of which the outer diameter is slightly smaller than an inner diameter of the first cylindrical portion 251 of the support member 250. The first adjusting nut 311 has the female screw 311a into which the first adjusting bolt 312 is screwed; and a through-hole 311b through which a third columnar portion 322c to be described later of the second adjusting bolt 322 passes. A lower end surface of the first adjusting nut 311 is in contact with an upper end surface of the first push rod 282 to exert a downward force on the first push rod 282.

The first adjusting bolt 312 is a member in which a plurality of columnar portions having outer diameters different from each other line up in the vertical direction. More specifically, the first adjusting bolt 312 has a first columnar portion 312a that is provided in an upper end portion thereof; a second columnar portion 312b that is provided below the first columnar portion 312a and has an outer diameter larger than that of the first columnar portion 312a; a third columnar portion 312c that is provided below the second columnar portion 312b and has an outer diameter smaller than that of the second columnar portion 312b; and a fourth columnar portion 312d that is provided below the third columnar portion 312c and has an outer diameter smaller than that of the third columnar portion 312c.

A groove 312e (refer to FIG. 3) is formed over the entire circumference of an outer circumferential surface of the first columnar portion 312a, and the groove 312e is concave inward from the outer circumferential surface and the oil seal 313 is fitted to the groove 312e. In addition, a concave portion 312f is formed in an upper end surface of the first columnar portion 312a and is concave downward from the upper end surface.

The outer diameter of the second columnar portion 312b is larger than an inner diameter of the through-hole 243b formed in the cap 240.

A male screw 312g is formed in an outer circumferential surface of the third columnar portion 312c, and the male screw 312g is screwed into the female screw 311a formed in the first adjusting nut 311.

The second adjusting nut 321 is a disc-shaped member of which an outer diameter is slightly smaller than the inner diameter of the first cylindrical portion 251 of the support member 250. The second adjusting nut 321 has the female screw 321a into which the second adjusting bolt 322 is screwed; and a through-hole 321b through which the fourth columnar portion 312d of the first adjusting bolt 312 passes. In addition, a through-hole 321c is formed in a center portion of the second adjusting nut 321, and the first push rod 282 passes through the through-hole 321c. A lower end surface of the second adjusting nut 321 is in contact with an upper end surface of the second push rod 295 to exert a downward force on the second push rod 295.

The second adjusting bolt 322 is a member in which a plurality of columnar portions having outer diameters different from each other line up in the vertical direction. More specifically, the second adjusting bolt 322 has a first columnar portion 322a that is provided in an upper end portion thereof; a second columnar portion 322b that is provided below the first columnar portion 322a and has an outer diameter larger than that of the first columnar portion 322a; a third columnar portion 322c that is provided below the second columnar portion 322b and has an outer diameter smaller than that of the second columnar portion 322b; and a fourth columnar portion 322d that is provided below the third columnar portion 322c and has an outer diameter smaller than that of the third columnar portion 322c.

A groove 322e (refer to FIG. 3) is formed over the entire circumference of an outer circumferential surface of the first columnar portion 322a, and the groove 322e is concave inward from the outer circumferential surface and the oil seal 323 is fitted to the groove 322e. In addition, a concave portion 322f is formed in an upper end surface of the first columnar portion 322a and is concave downward from the upper end surface.

The outer diameter of the second columnar portion 322b is larger than an inner diameter of the through-hole 243c of the columnar portion 243 formed in the cap 240.

The outer diameter of the third columnar portion 322c is smaller than an inner diameter of the through-hole 311b formed in the first adjusting nut 311.

A male screw 322g is formed in an outer circumferential surface of the fourth columnar portion 322d, and the male screw 322g is screwed into the female screw 321a formed in the second adjusting nut 321.

The operation portion 300 having the aforementioned configuration is contained in the space that is formed by the cap 240 and the support member 250. At this time, the first columnar portion 312a of the first adjusting bolt 312 is inserted into the through-hole 243b, and the first columnar portion 322a of the second adjusting bolt 322 is inserted into the through-hole 243c. In addition, the upper end surface of the first push rod 282 abuts against the lower end surface of the first adjusting nut 311, and the upper end surface of the second push rod 295 abuts against the lower end surface of the second adjusting nut 321.

Since the third columnar portion 322c of the second adjusting bolt 322 is fitted into the through-hole 311b of the first adjusting nut 311, the first adjusting nut 311 into which the first adjusting bolt 312 is screwed is prevented from being rotated and is moved in the vertical direction by rotation operation of the first adjusting bolt 312. Accordingly, the first push rod 282 moves in the vertical direction.

In contrast, since the fourth columnar portion 312d of the first adjusting bolt 312 is fitted into the through-hole 321b of the second adjusting nut 321, the second adjusting nut 321 into which the second adjusting bolt 322 is screwed is prevented from being rotated and is moved in the vertical direction by rotation operation of the second adjusting bolt 322. Accordingly, the second push rod 295 moves in the vertical direction.

Operation of Front Fork 21

Hereinafter, operation of the front fork 21 having the aforementioned configuration according to the embodiment will be described.

Extension Stroke

Figure 7A:
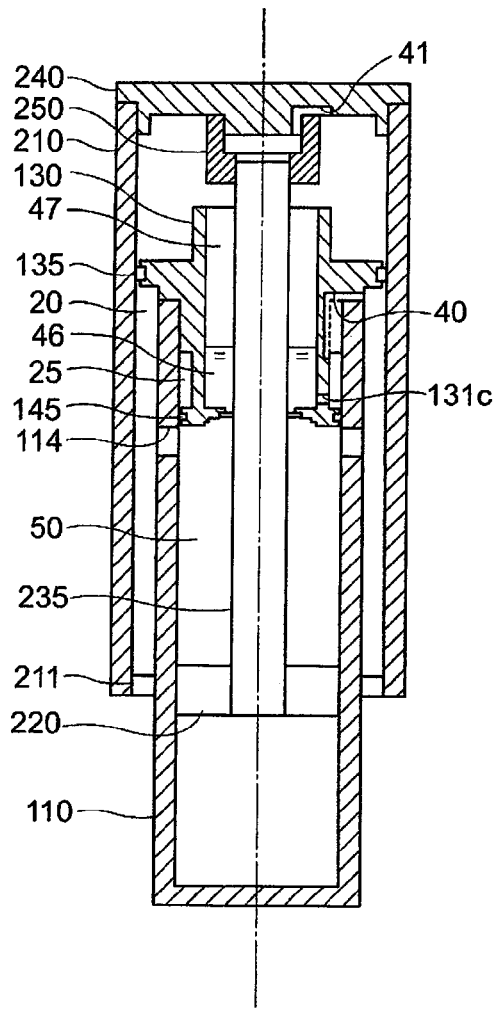
FIGS. 7A and 7B are views illustrating operation of an extension stroke.
Figure 7B:
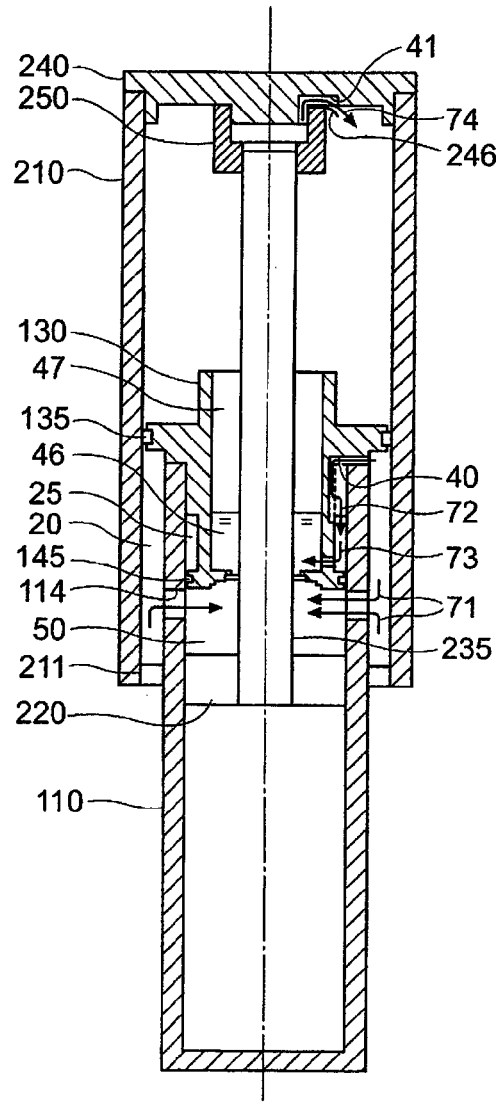

FIGS. 7A and 7B are views illustrating operation of an extension stroke. FIG. 7B is a view illustrating a state where the front fork 21 is extended from a state in FIG. 7A.

As illustrated in FIGS. 7A and 7B, when the inner tube 110 retreats from the outer tube 210, a distance between the oil ring 135 fitted to the ring groove 133a of the rod guide case 130 and the guide bush 211 fitted into the outer tube 210 becomes short, and a volume of the annular oil chamber 20 becomes small. Accordingly, oil in the annular oil chamber 20 flows into the working oil chamber 50 through the communication hole 114 of the inner tube 110 (refer to an arrow 71). In addition, since, by movement of the piston 220, a volume of the piston rod side oil chamber 51 of the working oil chamber 50 is decreased and a volume of the piston side oil chamber 52 is increased, the oil flowing into the working oil chamber 50 from the annular oil chamber 20 flows into the piston side oil chamber 52 from the piston rod side oil chamber 51 through the bypass 60 or the first oil path 220b formed in the piston 220. At this time, since the cross-sectional area of the annular oil chamber 20 is set to be larger than the cross-sectional area of the piston rod 235, a volume decrease V1 of the annular oil chamber 20 resulting from extension operation of the front fork 21 is larger than a volume decrease V2 resulting from retreat of the piston rod 235 from the working oil chamber 50, and since the communication path 40 is a path that is formed in the rod guide case 130 in order for the annular oil chamber 20 to communicate with the annular gap 25, surplus oil (V1−V2) in the working oil chamber 50 flows through the communication path 40 from the annular oil chamber 20 into the annular gap 25 formed between the rod guide case 130 and the inner tube 110 (refer to an arrow 72). Since the communication hole 131c is formed in the lower end portion of the cylindrical portion 131 of the rod guide case 130, oil flows into the oil chamber 46 of the oil reservoir chamber 45 from the annular gap 25 (refer to an arrow 73).

In addition, since, by movement of the piston 220, the volume of the piston rod side oil chamber 51 of the working oil chamber 50 is decreased and the volume of the piston side oil chamber 52 is increased, the oil flowing into the working oil chamber 50 from the annular oil chamber 20 flows into the piston side oil chamber 52 from the piston rod side oil chamber 51 through the bypass 60 or the first oil path 220b formed in the piston 220. In contrast, when pressure inside the piston rod side oil chamber 51 is increased by decrease in the volume of the piston rod side oil chamber 51, the upper end surface of the flange 151a of the check valve 151 abuts against the upper end surface of the second concave portion 142 of the rod guide case 130, and flow of oil from the working oil chamber 50 into the oil reservoir chamber 45 is suppressed. In addition, the oil seal 145 is fitted to the seal groove 132b formed in the inward portion 132 of the rod guide case 130, and the oil seal 145 prevents oil from flowing into the annular gap 25 from the working oil chamber 50.

During the extension stroke, a damping force is generated due to path resistance in the communication path 40 of the rod guide case 130 when oil flows into the annular gap 25 from the annular oil chamber 20. In addition, in a low speed region, a damping force is generated due to path resistance in the bypass 60 of which a circulation area is adjusted by adjusting a degree of opening of the needle valve 281 of the first adjustment mechanism 280. In a medium to high speed region, a damping force is generated due to bending deformation of the first valve 261 that blocks the first oil path 220b formed in the piston 220 of the damping force generating apparatus 260.

Compression Stroke

FIGS. 8A and 8B are views illustrating operation of a compression stroke. FIG. 8B is a view illustrating a state where the front fork 21 is compressed from a state in FIG. 8A.

As illustrated in FIGS. 8A and 8B, when the inner tube 110 enters the outer tube 210, a distance between the oil ring 135 fitted to the ring groove 133a of the rod guide case 130 and the guide bush 211 fitted into the outer tube 210 becomes large, and the volume of the annular oil chamber 20 becomes large. Accordingly, oil in the working oil chamber 50 flows into the annular oil chamber 20 through the communication hole 114 of the inner tube 110 (refer to an arrow 81). In addition, since, by movement of the piston 220, the volume of the piston side oil chamber 52 of the working oil chamber 50 is decreased and the volume of the piston rod side oil chamber 51 is increased, oil flows into the piston rod side oil chamber 51 from the piston side oil chamber 52 through the bypass 60 or the second oil path 220c formed in the piston 220. At this time, since the cross-sectional area of the annular oil chamber 20 is set to be larger than the cross-sectional area of the piston rod 235, a volume increase V3 of the annular oil chamber 20 resulting from compression operation of the front fork 21 is larger than a volume increase V4 resulting from entry of the piston rod 235 into the working oil chamber 50, and a deficient amount (=V3−V4) compared to the necessary supply amount of oil to the annular oil chamber 20 (=V3) is supplied to the annular oil chamber 20 from the oil reservoir chamber 45 through the check valve 151 (refer to an arrow 82). In addition, a deficient amount compared to the necessary supply amount of oil to the annular oil chamber 20 is supplied to the annular oil chamber 20 from the oil reservoir chamber 45 through the communication hole 131c, the annular gap 25 and the communication path 40 (refer to an arrow 83). However, the oil seal 145 is fitted to the seal groove 132b formed in the inward portion 132 of the rod guide case 130, and thereby preventing oil from flowing into the working oil chamber 50 from the annular gap 25.

During the compression stroke, a damping force is generated due to path resistance in the communication path 40 of the rod guide case 130 when oil flows into the annular oil chamber 20 from the annular gap 25. In addition, in the low speed region, a damping force is generated due to path resistance in the bypass 60 of which the circulation area is adjusted by adjusting the degree of opening of the needle valve 281 of the first adjustment mechanism 280. In the medium to high speed region, a damping force is generated due to bending deformation of the second valve 262 that blocks the second oil path 220c formed in the piston 220 of the damping force generating apparatus 260. The damping force resulting from the bending deformation of the second valve 262 is adjusted by the second adjustment mechanism 290.

As described above, in the front fork 21 according to the embodiment, during the extension operation, oil flows into the annular gap 25 from the annular oil chamber 20 through the communication path 40 and reaches the oil chamber 46 in the oil reservoir chamber 45 through the communication hole 131c. Accordingly, for example, even though air is trapped in an upper portion of the annular oil chamber 20, the air is discharged into the oil chamber 46 of the oil reservoir chamber 45 by a pressurized oil that flows into the annular gap 25 from the annular oil chamber 20 through the communication path 40, and the discharged air reaches the air chamber 47. In contrast, during the compression stroke, pressure in the annular oil chamber 20 becomes negative compared to the air chamber 47. However, the communication hole 131c formed in the rod guide case 130 is present in the lower end portion of the cylindrical portion 131 and inside the oil chamber 46 of the oil reservoir chamber 45, oil in the oil reservoir chamber 45 flows into the annular oil chamber 20 through the annular gap 25 and the communication path 40. For this reason, air in the oil reservoir chamber 45 is not sucked into the annular oil chamber 20.

In the front fork 21 according to the embodiment, it is possible to suppress occurrence of air bubble entrapment in the upper portion of the annular oil chamber 20 or an upper portion of the annular gap 25. Accordingly, it is possible to suppress occurrence of an impulse sound caused by occurrence of the air bubble entrapment in the upper portion of the annular oil chamber 20 or in the upper portion of the annular gap 25.

Configuration of Discharging Air Trapped in Operation Portion 300

Subsequently, a configuration of discharging air trapped in the operation portion 300 will be described.

FIG. 9A is a view illustrating cross-sections of the cap 240, the support member 250, the stopper rubber 255 and the outer tube 210. FIG. 9B is a cross-sectional view of portion IX-IX in FIG. 9A. The through-hole 243b and the through-hole 243c are formed at two circumferential locations in the inward portion 242 and the columnar portion 243 of the cap 240, the first adjusting bolt 312 is inserted into the through-hole 243b and the second adjusting bolt 322 is inserted into the through-hole 243c. The cross-sectional view illustrated in FIG. 9A is a cross-sectional view of a portion in which the through-holes 243b and 243c are not formed.

A columnar portion side concave portion 243d that is concave inward is formed as a partial circumferential area in the outer circumferential surface of the columnar portion 243 of the cap 240. In addition, an inward portion side concave portion 242a that is concave upward from the lower end surface is formed as a partial circumferential area in the inward portion 242 of the cap 240 at a position corresponding to a position of the columnar portion side concave portion 243d. In other words, as illustrated in FIG. 9A, the columnar portion side concave portion 243d and the inward portion side concave portion 242a as an example of the upward concave portion are continuously formed, and the columnar portion side concave portion 243d and the inward portion side concave portion 242a function as the communication path 41 through which a space 53, as an example of the upper portion space, inside the first cylindrical portion 251 of the support member 250 communicates with the air chamber 47.

As illustrated in FIG. 9A, a check valve 246 is provided as an example of a non-return valve between the lower end surface of the inward portion 242 of the cap 240 and the upper end surface of the first cylindrical portion 251 of the support member 250, and the check valve 246 is made of a thin plate to cover an opening portion of the inward portion side concave portion 242a. As illustrated in FIG. 9B, when the check valve 246 is seen from above, the check valve 246 has a size larger than that of the inward portion side concave portion 242a, and when pressure in the air chamber 47 is higher than pressure in the first cylindrical portion 251 of the support member 250, the check valve 246 abuts against the lower end surface of the inward portion 242 and blocks an opening portion of the communication path 41. In contrast, when pressure in the first cylindrical portion 251 of the support member 250 is higher than pressure in the air chamber 47, the check valve 246 is elastically deformed to open the opening portion of the communication path 41 and to discharge air in the space 53 inside the first cylindrical portion 251 of the support member 250 into the air chamber 47. The check valve 246 may be a donut-shaped plate that is provided in an outer circumference of the columnar portion 243 of the cap 240.

Accordingly, during extension operation of the front fork 21, pressure in the piston rod side oil chamber 51 is increased by upward movement of the piston 220 and decrease in the volume of the annular oil chamber 20, and the increased pressure is transmitted to the space 53 inside the first cylindrical portion 251 of the support member 250 in which the operation portion 300 is arranged via the through-hole 235c of the piston rod 235, an inner portion of the piston rod 235 (inner space of the piston rod), thereby discharging air in the space 53 into the air chamber 47 through the communication path 41 (refer to an arrow 74 in FIG. 7B). In contrast, during compression operation of the front fork 21, even though pressure in the air chamber 47 increases, air in the air chamber 47 is not sucked into the space 53 inside the first cylindrical portion 251 of the support member 250 in which the operation portion 300 is arranged since the check valve 246 blocks the opening portion of the communication path 41.

Accordingly, in the front fork 21 according to the embodiment, it is possible to suppress occurrence of the air bubble entrapment in the space 53 in which air is present and in which pressure increases during the extension operation inside the first cylindrical portion 251 of the support member 250. Accordingly, it is possible to suppress occurrence of the impulse sound caused by occurrence of the air bubble entrapment in the space 53 inside the first cylindrical portion 251 of the support member 250.

Another Embodiment of Configuration of Discharging Air Trapped in Operation Portion 300

Figure 10:
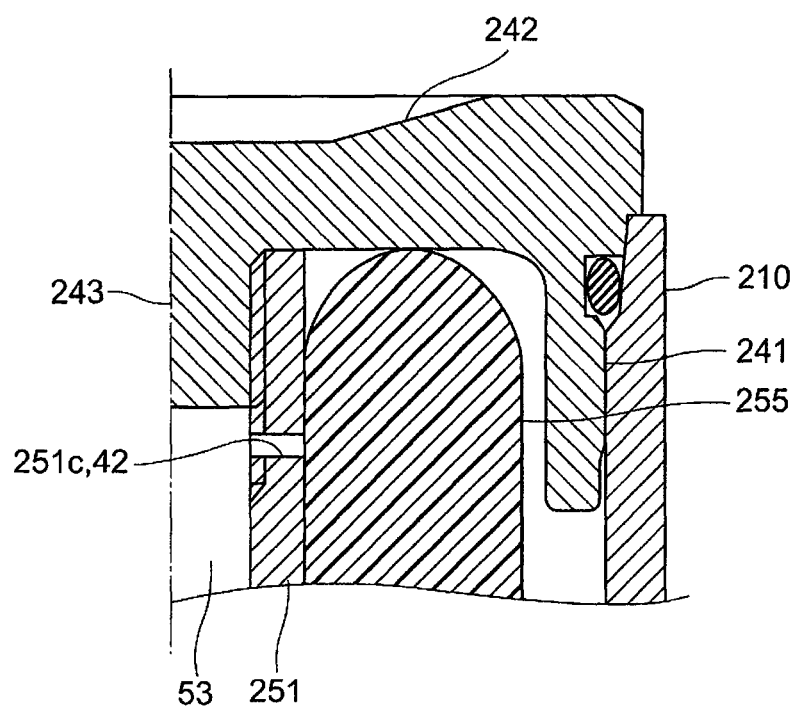
FIG. 10 is a view illustrating cross-sections of the cap, the support member, the stopper rubber and the outer tube according to another embodiment.

FIG. 10 is a view illustrating cross-sections of the cap 240, the support member 250, the stopper rubber 255 and the outer tube 210 according to another embodiment.

In another embodiment, a configuration of communicating the space 53 inside the first cylindrical portion 251 of the support member 250 with the air chamber 47 is different from aforementioned embodiment. That is, as illustrated in FIG. 10, a through-hole 251c is formed in a portion of the first cylindrical portion 251 of the support member 250 which is below the columnar portion 243 of the cap 240, and the through-hole 251c passes through the first cylindrical portion 251 in a direction orthogonal to the vertical direction (in a radial direction). The through-hole 251c functions as a communication path 42 through which the space 53 inside the first cylindrical portion 251 of the support member 250 communicates with the air chamber 47.

Even in another embodiment, during extension operation of the front fork 21, pressure in the piston rod side oil chamber 51 is increased by upward movement of the piston 220 and decrease in the volume of the annular oil chamber 20, and the increased pressure is transmitted to the space 53 inside the first cylindrical portion 251 of the support member 250 in which the operation portion 300 is arranged into the air chamber 47 through the through-hole 235c of the piston rod 235, the inner portion of the piston rod 235, thereby discharging air in the space 53 into the air chamber 47 through the communication path 42. At this time, the stopper rubber 255 that is provided around the first cylindrical portion 251 of the support member 250 is elastically deformed or is moved downward to open an opening portion of the communication path 42. In contrast, during compression operation of the front fork 21, even though pressure in the air chamber 47 increases, air in the air chamber 47 is not sucked into the space 53 inside the first cylindrical portion 251 of the support member 250 in which the operation portion 300 is arranged since the stopper rubber 255 blocks the opening portion of the communication path 42. Accordingly, even in another embodiment, during the extension operation, it is possible to suppress occurrence of the air bubble entrapment in the space 53 in which air is present and in which pressure increases during the extension stroke inside the first cylindrical portion 251 of the support member 250. Accordingly, it is possible to suppress occurrence of the impulse sound caused by occurrence of the air bubble entrapment in the space 53 inside the first cylindrical portion 251 of the support member 250.

In another embodiment, the communication path 42 is formed in the through-hole 251c formed in the first cylindrical portion 251 of the support member 250, and the space 53 inside the first cylindrical portion 251 of the support member 250 communicates with the air chamber 47 through the communication path 42. However, the invention is not limited to another embodiment. A communication path may be configured by the columnar portion side concave portion 243d of the cap 240 that is shown in FIGS. 9A and 9B, and a through-hole that is formed in a portion of the first cylindrical portion 251 of the support member 250 which faces the columnar portion side concave portion 243d of the cap 240 and that passes through the first cylindrical portion 251 in the direction orthogonal to the vertical direction (in the radial direction), and the space 53 inside the first cylindrical portion 251 of the support member 250 communicates with the air chamber 47 through the communication path. Instead of the communication path being configured by two members that are the cap 240 and the support member 250, when the communication path is formed in only one of the cap 240 and the support member 250, productivity can be improved since the cap 240 can be assembled into the support member 250 without regard to relative positions of configuration portions of the communication path during the assembly of the cap 240 and the support member 250.

What is claimed is:

1. A suspension apparatus comprising:
a cylindrical outer tube;
an inner tube which is coaxially arranged inside the outer tube to move in an axial direction relative to the outer tube;
a piston inserted into the inner tube;
a piston rod of which one end portion retains the piston and which moves together with the outer tube with respect to the inner tube;
a partition wall member that is mounted to an upper end portion of the inner tube to define an upper end portion of an annular oil chamber which is formed between an inner circumferential surface of the outer tube and an outer circumferential surface of the inner tube, that has a bowl portion formed into a bowl shape located inside the inner tube, and that divides a space inside the inner tube into an upper space which is a space above the bowl portion and a lower space which is a space below the bowl portion;
a cap that covers an upper opening portion of the outer tube; and
a support member of which one end portion is retained by the cap, and of which the other end portion supports the other end portion of the piston rod,
wherein a through-hole is formed in a portion of the inner tube which is below the partition wall member to communicate the annular oil chamber with the lower space,
an inner space of the piston rod is a space inside the piston rod and communicates with the lower space,
the support member is a cylindrical member and forms an upper portion space between the cap and the support member, and the upper portion space communicates with the inner space of the piston rod,
at least one of the cap and the support member is provided with a communication path through which the upper portion space communicates with the upper space,
the cap has an abutting surface against which an upper end surface of the support member abuts, and
the communication path comprises a non-return valve that is arranged between the abutting surface of the cap and the upper end surface of the support member such that air flows from the upper portion space into the upper space through the communication path, while the air is prevented from flowing from the upper space into the upper portion space, wherein the communication path is defined by a first concave section formed in a columnar portion of the cap and a second concave section formed in an inward portion of the cap.

2. The suspension apparatus according to claim 1, wherein the piston retains a dividing member that divides the lower space into an upper positioning space which is a space positioned above the dividing member and a lower positioning space which is a space positioned below the dividing member, and has a space communication hole that is a hole to communicate the upper positioning space with the lower positioning space,
the suspension apparatus further comprises an adjustment mechanism that adjusts the rate of a fluid passing through the space communication hole of the piston, and
an operation portion operating the adjustment mechanism is arranged inside the upper portion space.

3. The suspension apparatus according to claim 1, wherein
a front fork is the suspension apparatus,
during an extension operation of the front fork, air flows from the upper portion space into the upper space through the communication path, and
during a compression operation of the front fork, air is prevented from flowing from the upper space into the upper portion space.

4. The suspension apparatus according to claim 1, wherein an openable and closeable portion of the non-return valve contacts and seats against the abutting surface of the cap.

5. The suspension apparatus according to claim 1, wherein the first and second concave sections are orthogonal to one another.

6. The suspension apparatus according to claim 1, wherein the second concave section is recessed relative to the abutting surface which is disposed adjacent thereto.

7. The suspension apparatus according to claim 1, wherein the non-return valve seats against the abutting surface outside of a peripheral edge of the second concave section.

8. The suspension apparatus according to claim 1, wherein the non-return valve, as measured along a longitudinal axis thereof, is disposed in its rest state in an orientation that is perpendicular to a longitudinal axis of the outer tube.

9. The suspension apparatus according to claim 1, wherein the first concave section faces an inner cylindrical surface of the support member to define a portion of the communication path.

10. The suspension apparatus according to claim 1, wherein one end of the non-return valve seats against the upper end surface of the support member and the other end of the non-return valve seats against the abutting surface of the cap.

* * * * *